United States Patent [19]
Anderson

[11] 3,959,907
[45] June 1, 1976

[54] FILM RECORD CARD

[75] Inventor: Thomas P. Anderson, Hubbard Woods, Ill.

[73] Assignee: Microseal Corporation

[22] Filed: Dec. 9, 1971

[21] Appl. No.: 206,323

Related U.S. Application Data

[63] Continuation of Ser. No. 866,344, Oct. 14, 1969, abandoned.

[52] U.S. Cl. .................................................. 40/159
[51] Int. Cl.² ............................................ G09F 1/10
[58] Field of Search ................. 40/158, 158 B, 159, 40/104.18, 104.19

[56] References Cited
UNITED STATES PATENTS

| | | | |
|---|---|---|---|
| 1,410,130 | 3/1922 | Sinclair | 40/158 B |
| 1,477,131 | 12/1923 | Kulik | 40/158 B |
| 2,544,844 | 3/1951 | Liber | 40/158 B |
| 2,612,711 | 10/1952 | Baker | 40/158 R |
| 2,690,021 | 9/1954 | Langan | 40/158 R |
| 2,977,017 | 3/1961 | Herzig | 40/158 R |
| 3,147,561 | 9/1964 | Anderson et al. | 40/158 R |
| 3,339,303 | 9/1967 | Anderson | 40/159 |
| 3,564,745 | 2/1971 | Johnson | 40/158 B |

Primary Examiner—Hugh R. Chamblee
Assistant Examiner—Wenceslao J. Contreras

[57] ABSTRACT

A film record card having an elongated, rectangular film pocket sized to receive a plurality of aligned microfilm strips is characterized by at least one discrete mass of non-setting adhesive attached to one or both of a pair of longitudinally extending sidewalls of the pocket and projecting inwardly of the pocket for grippingly engaging the film strips, thereby to retain the individual film strips in certain preselected positions within the pocket for enabling accurate automatic scanning of the film record card.

7 Claims, 4 Drawing Figures

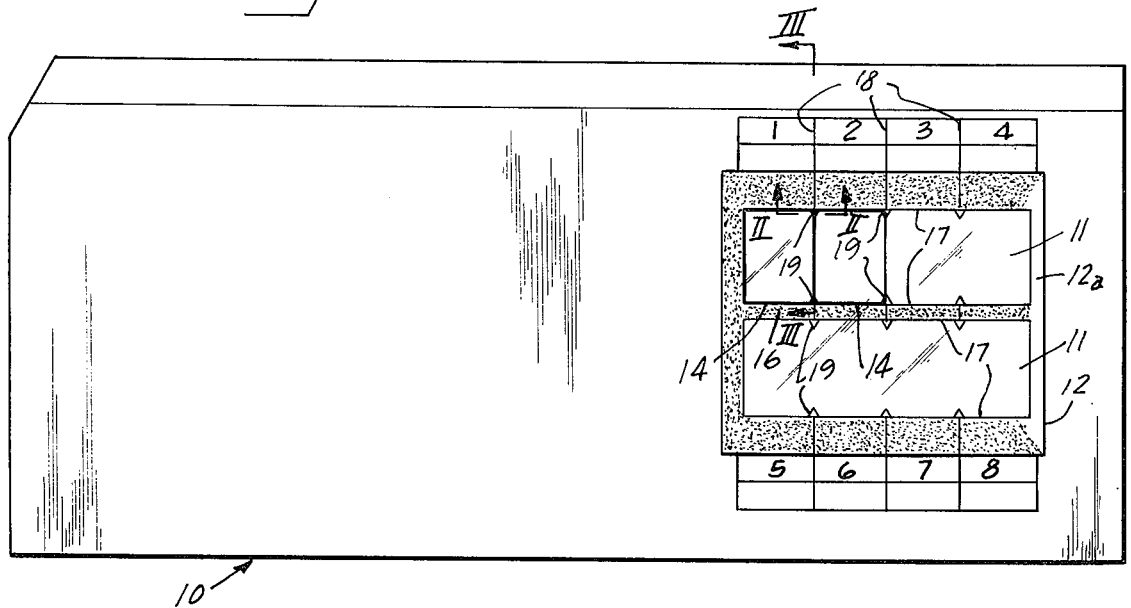
Fig. 1
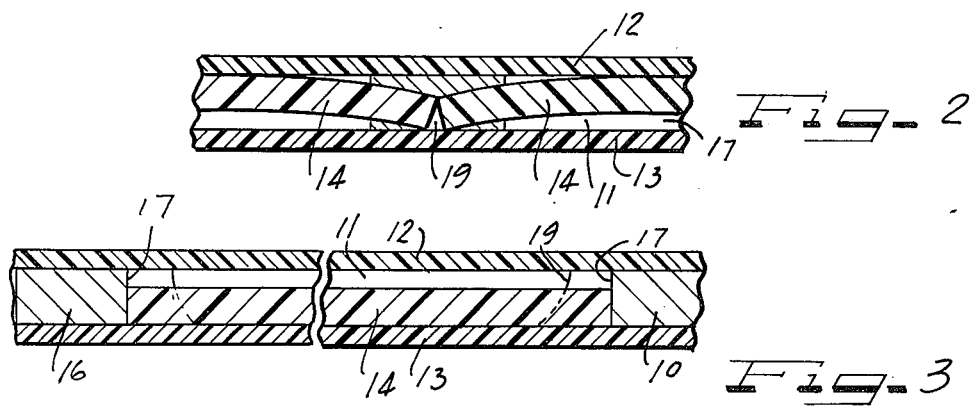
Fig. 2
Fig. 3
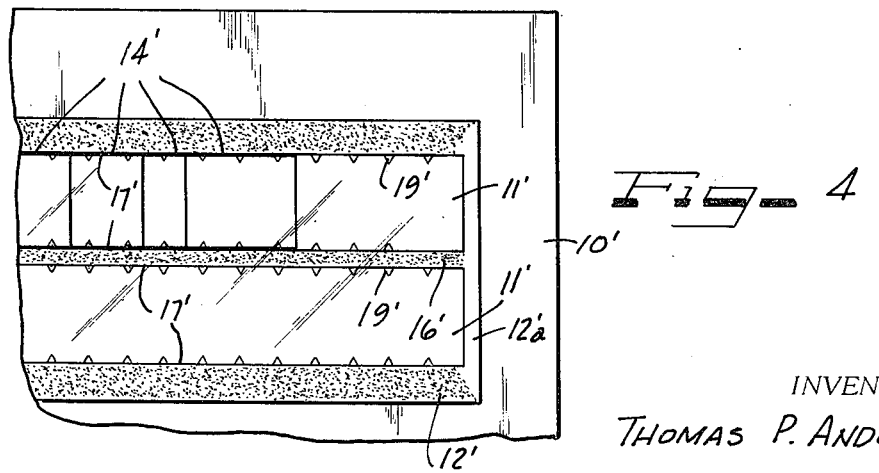
Fig. 4
INVENTOR.
THOMAS P. ANDERSON

FILM RECORD CARD

This application is a continuation of application Ser. No. 866,344 filed Oct. 14, 1969, now abandoned.

BACKGROUND OF THE INVENTION

1. Field of the Invention

This invention is directed to film record cards and more particularly refers to a film record card of the type having at least one elongated aperture for receiving a plurality of aligned microfilm strips or the like and means retaining individual ones of the strips in certain preselected positions within the aperture. The term "film record card" as used herein includes film jackets wholly or partially transparent and all other business cards adapted to display or receive microfilm records.

2. Description of the Prior Art

Some film record card users may require a card capable of receiving updated or additional microfilm strips inserted serially into the film pockets from time to time or a card capable of receiving a variable member of individual microfilm strips or frames. For example, a microfilm medical record may contain a series of periodically updated reports or X-rays, or an insurance company may record an insurance policy, having a variable number of pages depending upon policy provisions, on microfilm.

Further, automatic sorting, scanning and projecting equipment has been developed for selecting a certain film record card from a file of cards and projecting a selected one of several film strips disposed in certain positions on the selected card. Effective use of automatic scanning and projecting apparatus necessarily requires that the individual microfilm strips be retained on the card in preselected and ascertainable positions.

SUMMARY OF THE INVENTION

A film record card, constructed in accordance with the principles of the present invention, has at least one elongated rectangular film pocket sized to receive a plurality of aligned microfilm strips or frames and is characterized by retaining means in the pocket for grippingly engaging individual ones of the microfilm strips or frames, thereby to retain the strips at certain predetermined positions within the pocket for enabling automatic scanning of the card and projecting of a preselected one of the individual frames. I have found that where records are being reproduced directly from the microfilm it is very important that the film be securely and accurately held in a predetermined position by a means that does not obscure or intefer with the reproduction of the filmed matter.

The retaining means comprise at least one discrete mass of non-setting adhesive attached to the card along one or both opposed, longitudinally extending sidewalls of the film pocket and extending inwardly of the pocket. Thus, when film means, which may be individual pieces including a frame or frames of film, are inserted in the pockets the retaining means grippingly engage them along an edge or in a corner or film frame juncture area and hold them in predetermined position along the pocket. The card may include cooperating indicia or other means indicating film frame positions. The individual frame positions may be designated to carry predetermined film copies of information. Thus, it will be understood in the example that in a card file incorporating the invention, an individual's birth certificate copy may be in a first predetermined position, his marriage certificate in another, his social security identification in yet another, etc. With this system envisioned by the invention herein it will be possible to easily retrieve these microfilmed documents and project or reproduce them either manually or by machine on the basis of their predetermined position in the record card. Accordingly, it will be understood that exact positioning of the film frames is critical to the successful functioning of the system. By means of the invention this exact and secure positioning is effected in a simple and very efficient manner.

Microfilm images may be produced by either a planetary type camera, which produces individual frames having a regular center-to-center spacing, or a rotary-type camera, which produces individual frames having an irregular spacing therebetween dependent upon the size of the object being photographed. Where a film record card of the present invention is to be used with microfilm produced by a planetary-type camera, discrete masses of non-setting adhesive may be positioned along longitudinal edges of the film pocket at juncture lines between adjacently disposed film strips. On the other hand, where it is contemplated to utilize the film record card with the irregularly sized frames produced by a rotary-type camera, a plurality of the discrete masses of adhesive or a continuous line of adhesive may be longitudinally disposed along the pocket sidewalls.

BRIEF DESCRIPTION OF THE DRAWINGS

FIG. 1 is an elevational view of a film record card embodying the features of the present invention;

FIG. 2 is a sectional view taken substantially along line II—II of FIG. 1;

FIG. 3 is a sectional view taken substantially along line III—III of FIG. 1; and FIG. 4 is an enlarged, partial plan view of an alternative embodiment of the present invention.

DETAILED DESCRIPTION OF CERTAIN PREFERRED EMBODIMENTS

Referring to the drawings, a film record card constructed in accordance with the principles of the present invention is generally indicated at 10 and comprises a card having a configuration of a statistical tabulating card for enabling automatic machine sorting thereof.

The film record card 10 has a pair of elongated, rectangular apertures as at 11 formed therein. Transparent enveloping members or sheets 12 and 13 having a rectangular configuration are mounted on front and rear surfaces, respectively, of the card 10 so that they overlie the apertures 11. The rear sheet 13 may be secured to the rear wall about the entire periphery of the aperture 11 by means of a suitable adhesive coating.

In order to permit insertion and removal of individual microfilm strips or frames as at 14 into the elongated, rectangular film receiving pockets formed by the enveloping members 12 and 13 in conjunction with the apertures 11, 11, the front enveloping member 12 is mounted over the apertures so that the edge portions thereof overlie peripheral portions defining the apertures 11, 11 but only three edges of the enveloping member 12 are secured to the front card surface. In that manner, an unsecured portion 12a of the front enveloping member overlies the front card surface, thereby to form a slight gap between the enveloping member 12 and the card 11 for enabling insertion of film strips into the film receiving pockets.

The enveloping members 12 and 13 are also secured to the front and rear surfaces of the card along a small rib portion 16 separating the pair of apertures 11.

Since microfilm strips are generally of a constant width, either 35mm. or 16mm., the apertures 11 have longitudinally extending, opposed sidewall portions as at 17 spaced apart a constant distance slightly exceeding the width of microfilm strips to be inserted into the pockets. The microfilm strips 14 may have a regular and consistent length or a substantially irregular length depending upon the type of equipment utilized to produce the individual frames or strips. It will be noted that where a planetary-type camera is utilized to produce the individual microfilm frames, the frames 14 will have a substantially constant length, whereas a rotary-type camera produces irregularly lengthed frames depending upon the size of the object photographed. The apertures 11 may also be configured to accept a longitudinally aligned series of film strips, i.e. have longitudinally extending opposed sidewalls spaced apart a distance slightly exceeding a constant length of film strips produced by a planetary-type camera.

Several film record card applications may require a card having film receiving pockets sized to accept a plurality of individual microfilm strips or frames. The film record card of the present invention is particularly adapted for that type of application, and thus, the apertures 11, 11 defining the film receiving pockets have a longitudinal length sized to accept a plurality of juxtapositionally disposed individual film strips or frames. As illustrated in FIG. 1, the film record card 10 has a pair of parallel apertures 11 each formed with a vertical width for loosely receiving 16mm. film strips and each having a longitudinal length slightly exceeding the accumulated lengths of four microfilm frames produced by a planetary-type camera. In that manner, eight individual positions, as delineated by vertically extending markings as at 18 are provided for receiving eight individual, regular lengthed 16mm. microfilm frames. Although a film record card having eight individual positions is illustrated in the drawings, other arrangements are possible including apertures elongated transversely of the card 10.

It should be noted that scanning and projecting equipment is available for positioning the card 10 within projecting apparatus to permit viewing or projecting images contained on a preselected one of the microfilm frames.

In accordance with the principles of the present invention, the film record card 10 has retaining means attached thereto and disposed within the film receiving pockets for grippingly engaging the individual film strips 14 to retain the same in alignment with selected ones of the eight delineated positions. The retaining means of the present invention comprise at least one discrete mass of non-setting adhesive attached to the card 10 along one or both of the longitudinally extending sidewalls 17 of the apertures 11. As illustrated in FIG. 1, a plurality of adhesive masses 19 are arranged in confronting pairs oppositely disposed on the pairs of sidewalls 17 defining the apertures 11. Also, the pairs of adhesive masses are disposed at juncture planes between adjacent ones of the film strips or pieces 14, as defined by the vertically extending lines 18, and thus, the adhesive masses, which remain in a tacky condition, grippingly engage corner portions of the film strips 14 disposed adjacent the juncture planes.

In that manner, the film strips or pieces 14 are restrained against movement longitudinally of the elongated rectangular pockets, thereby to retain the film strips within the selected positions regardless of whether an entire length of the aperture 11 is filled with individual film strips. It should also be noted that the use of a non-setting adhesive permits the individual microfilm strips or frames 14 to pass through the retaining masses as the same are inserted into the pockets. The widely spaced adhesive masses, as illustrated in FIG. 1, offers very little resistance to insertion of the film strips. Although the present invention contemplates providing a continuous strip of adhesive extending entirely along one or both of the longitudinal edges 17 of each of the apertures 11, it has been found that for apertures configured to accept a multiplicity of film strips or frames, a continuous line of adhesive may excessively retard insertion of the film strips. Thus, a spaced series of discrete masses of adhesive, as illustrated in the drawings, is preferred where insertion of the film strips is a critical factor.

As best illustrated in FIG. 2, the film strips 14 have a natural curl urging the opposite edge portions thereof rearwardly into engagement with the rear enveloping member 13. That natural curl in conjunction with the adhesive masses 19 restrains movement of the film strip edges at the juncture planes in a direction perpendicular to a plane of the card 10, thereby to prevent one film strip from over-riding onto an adjacently disposed film strip.

As best seen in FIG. 4, it is also contemplated by the present invention to provide retaining means for use with irregularly length film strips as at 14', which are produced by a rotary-type camera. In this embodiment, a series of spaced adhesive masses as at 19' are disposed along the longitudinally extending sidewalls 17' of the apertures 11'. The spacing between longitudinally adjacent ones of the masses 19' of non-setting adhesive may vary depending upon an average length of the film strip but will usually be more closely spaced than the spacing between longitudinally adjacent ones of the adhesive masses 19 as described hereinabove for the first embodiment. Adhesive masses 19' do not necessarily engage the film strips 14' at juncture planes but grippingly engage opposed edge portions of the film strips for restraining movement thereof longitudinally of the apertures 11', thereby to retain the film strips in position within the film receiving pockets.

Although those versed in the art may suggest various minor modifications, it should be understood that I wish to embody within the scope of the patent warranted hereon all such modifications as reasonably and properly come within the scope of my contribution to the art.

I claim as my invention:

1. A film record card comprising a card means having at least a transparent portion with at least one generally elongated pocket means therein adapted to receive therein a film means including a plurality of frames of generally uniform width, said pocket means having generally parallel side edge portions and being of a length to receive a plurality of film means, and a plurality of discrete masses of non-setting adhesive means in said pocket means along at least one of said side edge portions spaced apart a distance generally conforming to said width of said film frames whereby said adhesive means will act to locate the juncture areas between said film means and frames, said adhesive means extending inwardly of said pocket from a respective side edge portion for grippingly engaging said film means to restrain movement thereof and retain the engaged film means at a selected predetermined position within said pocket means.

2. A film record card according to claim 1 further characterized by a plurality of said discrete masses of non-setting adhesive being arranged in longitudinally spaced pairs in said pocket along opposite ones of said pocket side edge portions and extending inwardly of said pocket side edge.

3. A film record card according to claim 2 further characterized by said pairs of discrete masses of non-setting adhesive being disposed in the region of juncture areas between adjacently disposed film means having predetermined lengths.

4. A film record card according to claim 1 wherein a plurality of said pocket means are positioned adjacent each other, said pockets each having parallel side edge portions spaced apart a distance to receive therein a plurality of film means having constant width.

5. A film record card comprising a card member having at least one elongated, rectangular transparent pocket formed therein, said pocket having a pair of parallel, longitudinally extending side edge portions, said pocket receiving a plurality of film pieces having a constant width, retaining means comprising a plurality of adhesive dots in said pocket spaced along said longitudinal side edges thereof at predetermined position so that said dots are in juncture areas between said film pieces, said retaining means releasably grippingly engaging the film strips for restraining movement thereof longitudinally of said elongated pocket whereby said film pieces are securely retained in exact predetermined positions in said pocket.

6. A film record card according to claim 5 wherein said card bears cooperating indicia indicating predetermined film frame positions whereby retrieval and reproduction of the filmed matter according to the predetermined position of the documents is facilitated.

7. A film record card according to claim 5 wherein said card bears cooperating indicia indicating predetermined film frame position whereby retrieval and reproduction of the filmed matter according to the predetermined position of the documents is facilitated.

* * * * *